United States Patent
Kreutzkaemper et al.

(10) Patent No.: US 11,149,792 B2
(45) Date of Patent: Oct. 19, 2021

(54) LUBRICANT INJECTOR

(71) Applicant: SKF LUBRICATION SYSTEMS GERMANY GMBH, Walldorf (DE)

(72) Inventors: Juergen Kreutzkaemper, Waibstadt-Daisbach (DE); Herbert Kannegiesser, Duesseldorf (DE); Edward Schneider, Ketsch (DE); Ralf Trinkel, Frankenthal (DE)

(73) Assignee: SKF LUBRICATION SYSTEMS GERMANY GMBH, Walldorf (DE)

( * ) Notice: Subject to any disclaimer, the term of this patent is extended or adjusted under 35 U.S.C. 154(b) by 835 days.

(21) Appl. No.: 15/277,538

(22) PCT Filed: Mar. 20, 2015

(86) PCT No.: PCT/EP2015/055921
§ 371 (c)(1),
(2) Date: Sep. 27, 2016

(87) PCT Pub. No.: WO2015/150117
PCT Pub. Date: Oct. 8, 2015

(65) Prior Publication Data
US 2017/0074323 A1    Mar. 16, 2017

(30) Foreign Application Priority Data
Mar. 31, 2014    (DE) .................... 102014205975.5

(51) Int. Cl.
*F16C 33/46*    (2006.01)
*F16N 27/02*    (2006.01)
(Continued)

(52) U.S. Cl.
CPC .......... *F16C 33/4647* (2013.01); *F16C 43/04* (2013.01); *F16N 25/02* (2013.01);
(Continued)

(58) Field of Classification Search
CPC ............................ F16C 33/4647; F16N 25/02
(Continued)

(56) References Cited

U.S. PATENT DOCUMENTS 2,699,842 A * 1/1955 Juettner ................. F16N 27/00
                                                                   184/7.4
2,973,058 A * 2/1961 Bricout .................. F16N 25/02
                                                                   184/7.4
(Continued)

FOREIGN PATENT DOCUMENTS

CN        101418903 A    4/2009
DE          7239368 U    5/1973
(Continued)

*Primary Examiner* — Michael R Mansen
*Assistant Examiner* — Mark K Buse
(74) *Attorney, Agent, or Firm* — J-Tek Law PLLC; Scott T. Wakeman; Mark A. Ussai

(57) ABSTRACT

A lubricant injector includes a lubricant inlet, a lubricant outlet, a control piston and a metering piston. The control piston is configured to conduct lubricant from the lubricant inlet to the metering piston, and the metering piston is configured to pump the lubricant provided by the control piston to the at least one lubricant outlet. The metering piston includes a first metering chamber and a second metering chamber that are each connected to the at least one lubricant outlet. The lubricant injector further includes first and second lubricant channels, and in a first switching state of the control piston the lubricant inlet is connected via the first control space to the first lubricant channel and the second metering chamber, and in a second switching state the lubricant inlet is connected via the second control space to the second lubricant channel and the first metering chamber.

20 Claims, 8 Drawing Sheets

(51) Int. Cl.
*F16N 25/02* (2006.01)
*F16C 43/04* (2006.01)

(52) U.S. Cl.
CPC .......... *F16N 27/02* (2013.01); *F16C 2204/60* (2013.01); *F16C 2240/70* (2013.01)

(58) Field of Classification Search
USPC .......................................................... 184/7.4
See application file for complete search history.

(56) References Cited

U.S. PATENT DOCUMENTS

| | | | | |
|---|---|---|---|---|
| 3,590,956 A | * | 7/1971 | Obergefell | F16N 25/02 184/7.4 |
| 3,841,438 A | * | 10/1974 | Tine | F01M 1/08 184/7.4 |
| 3,915,259 A | * | 10/1975 | Otte | F16N 25/00 184/7.4 |
| 4,520,902 A | * | 6/1985 | Snow | F16N 25/02 137/596.12 |
| 5,147,016 A | * | 9/1992 | Antila | F16N 25/02 137/625.17 |
| 5,285,871 A | * | 2/1994 | Sievenpiper | F16N 11/10 184/29 |
| 2003/0089553 A1 | * | 5/2003 | Conley | F16N 25/02 184/7.4 |
| 2006/0213725 A1 | * | 9/2006 | Czempisz | F16N 25/02 184/7.4 |
| 2013/0034321 A1 | * | 2/2013 | Beck | F16C 33/4694 384/577 |
| 2013/0092475 A1 | * | 4/2013 | Arens | F16N 27/00 184/7.4 |
| 2016/0033079 A1 | * | 2/2016 | Guenther | F16N 7/385 184/7.4 |
| 2018/0149461 A1 | * | 5/2018 | Hess | F16N 13/02 |

FOREIGN PATENT DOCUMENTS

| | | |
|---|---|---|
| DE | 723936 U | 7/1973 |
| DE | 7239368 U | 7/1973 |
| DE | 2433811 A1 | 1/1976 |
| DE | 2533811 A1 | 3/1976 |
| DE | 20309553 U1 | 9/2003 |
| DE | 102004039353 A1 | 2/2006 |
| DE | 102006012810 A1 | 9/2006 |
| DE | 60215036 T2 | 2/2007 |
| EP | 1779023 A1 | 5/2007 |

* cited by examiner

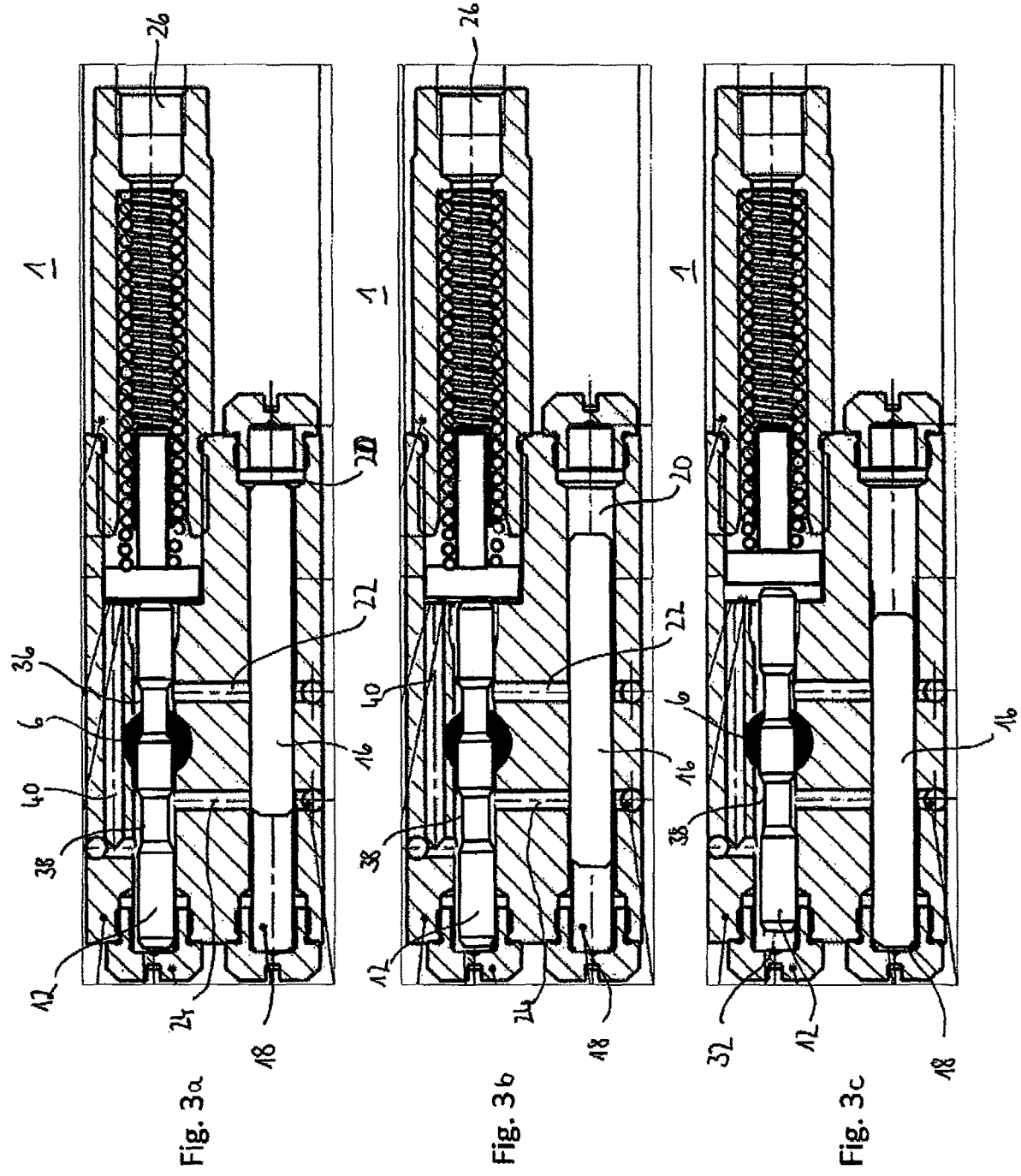

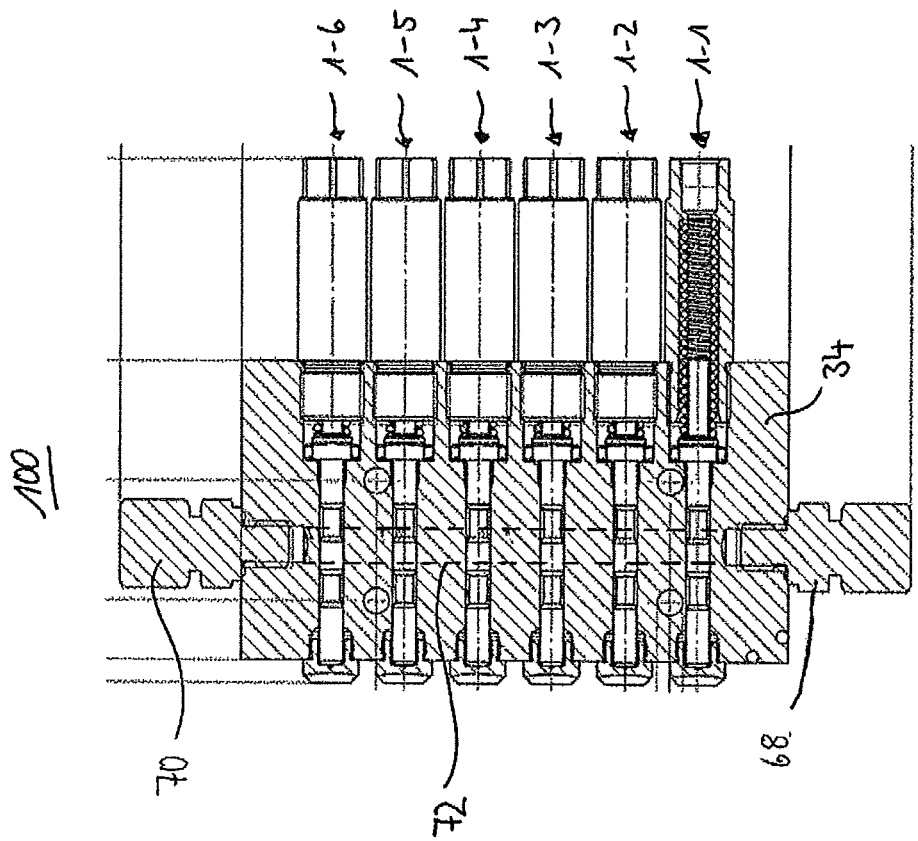

LUBRICANT INJECTOR

CROSS-REFERENCE

This application is the U.S. National Stage of International Application No. PCT/EP2015/055921 filed on Mar. 20, 2015, which claims priority to German patent application no. 10 2014 205 975.5 filed on Mar. 31, 2014.

TECHNOLOGICAL FIELD

The present invention relates to a lubricant injector for delivery of lubricant to at least one lubricant outlet point as well as a lubricant injector block with at least two such lubricant injectors.

BACKGROUND

Lubricant injectors, also called lubricant distributors, are known in the prior art and are often used as part of centralized lubrication devices with which a lubricant is dispensed from a central lubricant source to at least one lubricant consumer. Here the lubricant injector usually includes a lubricant inlet that is connected to a lubricant source, in particular a lubricant pump, wherein the lubricant source sequentially pumps pressurized lubricant to the lubricant injector. Furthermore, the lubricant injector usually includes a control piston that is designed to guide lubricant from the lubricant inlet into a metering chamber of a metering piston, out from which the quantity of lubricant available in the metering chamber is delivered to the lubricant outlet and then to the lubricant consumer.

Lubricant injectors are known from the prior art, for example, EP 1 631 767 (family member of US 2005/258004), DE 602 15 036 (family member of U.S. Pat. No. 6,986,407), or EP 1 779 023 (family member of US 2008/289906), whose control piston is displaceable under the lubricant pressure present at the lubricant inlet against the effect of a first return spring into a metering position wherein the control piston releases a passage of lubricant to a first metering chamber. The metering piston itself is also displaceable against the effect of a second return spring, whereby the lubricant present in a second metering chamber is urged toward a lubricant outlet chamber and from there to a lubricant outlet. In the event of lubricant discharge at the lubricant inlet, for example, due to the lubricant pump cycle, the metering piston can be transferred into its initial position, whereby the lubricant present in the first metering chamber is transferred into the second metering chamber and a dispensing chamber.

However, it is disadvantageous with the lubricant injectors known from the prior art that they must be assembled from very many components, and are already very complicated to manufacture due to the two required return springs and the required connecting channel between the different chambers. Moreover, the metering chamber and the metering piston must be manufactured sufficiently large such that sufficient lubricant can be provided per lubricant pump cycle to the lubricant outlet. The lubricant injector thereby occupies a large installation space.

Alternatively it has been proposed in the prior art, for example, DE 2433811 or also DE 10 2006 012 810 (family member of us 2006/213725), to dispose the metering piston and control piston adjacent to each other in order to reduce the installation space requirement of the injector. However, in order to supply such lubricant injectors with lubricant, at least two lubricant-supply points must usually be provided for the two switching states of the control piston. This in turn necessitates a large installation-space requirement outside the lubricant injector, and/or further elements, such as, for example, valves or distributors, that ensure that lubricant can be provided to the two lubricant-supply points.

SUMMARY

The object of the present invention is therefore to provide a robust and reliably functioning lubricant injector that requires little space and is simple to manufacture here.

The inventive lubricant injector includes a housing with at least one lubricant inlet and at least one lubricant outlet, as well as a control piston and a metering piston, wherein the control piston is designed to guide lubricant from the lubricant inlet to the metering piston. The metering piston is furthermore designed to pump lubricant provided from the control piston to the at least one lubricant outlet. Here the invention is based on the idea to form the metering piston such that the metering piston includes a first metering chamber configured as a first piston workspace and a second metering chamber configured as a second piston workspace, which are each directly connected to the at least one lubricant outlet. Due to the lubricant injector thus formed, lubricant can both be guided both directly from the first metering chamber and from the second metering chamber, preferably without pressure loss, directly to the at least one lubricant outlet without the lubricant, as known in particular from DE 602 15 036, first having to be guided from one of the metering chambers into an outlet chamber.

Furthermore the lubricant injector further includes a first lubricant channel and a second lubricant channel, wherein the first lubricant channel connects the first metering chamber to the lubricant inlet or the lubricant outlet, and the second lubricant channel connects the second metering chamber to the lubricant inlet or the lubricant outlet. Since the first and the second lubricant channel can be used both as lubricant supply to the metering chambers and lubricant removal from the metering chambers, the channels provided in the housing of the lubricant injector are significantly reduced, which simplifies manufacturing.

In order to provide a robust- and space-saving-as-possible lubricant injector, the control piston furthermore includes a first control space, in particular a first ring space, and a second control space, in particular a second ring space, and thus defines a first switching state wherein the lubricant inlet is connected via the first control space of the control piston to the first lubricant channel and the second metering chamber of the metering piston. In contrast, in the second switching state the lubricant inlet is connected via the second control space of the control piston to the second lubricant channel, rather than the first metering chamber of the metering piston.

Even with adjacently disposed control piston and metering piston only one lubricant inlet may be available, which supplies either the first control space or the second control space with lubricant. This in turn significantly simplifies the construction of the lubricant injector, since the in any case available control piston also controls whether the metering chamber is connectable to the lubricant inlet or the lubricant outlet. Furthermore, with the proposed lubricant injector more lubricant can advantageously be provided from the lubricant injector to the lubricant outlet without enlarging the installation space. In addition the construction of the lubricant injector can be significantly simplified since no connection need be produced between the first and the second metering chamber or a further return element be provided for the metering piston. An expensive adapting of the return elements to one another can thereby be eliminated. In addition, a relatively large metering bandwidth can be provided with the inventive lubricant injector.

According to one advantageous exemplary embodiment the first lubricant channel is connected via a first lubricant outlet channel, and the second lubricant channel via a second lubricant outlet channel, to the at least one lubricant outlet. The advantageous lubricant outlet channels here ensure a simple guiding of the lubricant from the respective lubricant channel or the respective metering chamber to the at least one lubricant outlet. In addition, in the other corresponding switching state this lubricant outlet channel can be closed off in a simple manner using the control piston.

As mentioned above, in one advantageous exemplary embodiment in a first switching state of the control piston the lubricant inlet is connected via the first control space of the control piston and the first lubricant channel to the second metering chamber of the control piston, while in the second switching state the lubricant inlet is connected via the second control space of the control piston and the second lubricant channel to the first metering chamber of the control piston. On the other side here in the first switching state of the control piston the first metering chamber of the metering piston is connected via the second lubricant channel and the second control space of the control piston to the at least one lubricant outlet, while in the second switching state the second metering chamber of the metering piston is connected via the first lubricant channel and the first control space of the control piston to the at least one lubricant outlet.

Via the correspondingly disposed control spaces the control piston can be controlled using the lubricant introduced via the lubricant inlet and transferred from a first switching state into a second switching state. Depending on the respective switching state lubricant is in turn pumped from the first or the second metering chamber to the lubricant outlet, while the respective other metering chamber is simultaneously impinged with lubricant. During a pumping cycle a lubricant pump connected to the lubricant inlet can thereby provide lubricant both from the first and from the second metering chamber to the lubricant outlet, whereby the provided lubricant amount increases overall.

However, such a design of the inventive lubricant injector also has the further advantage that the lubricant need not be provided from the first or the second metering chamber to the same lubricant outlet, rather, as a further preferred exemplary embodiment shows, it is possible to provide a first and a second lubricant outlet that are each impinged with lubricant with the lubricant from the first or second metering chamber. Using one lubricant injector lubricant can thereby not only, as in the prior art, be provided to one lubricant outlet, rather it is possible to simultaneously supply two consumers with lubricant.

Here it is particularly advantageous if the first lubricant outlet is connected to the first lubricant outlet channel and the second lubricant outlet to the second lubricant outlet channel.

According to a further advantageous exemplary embodiment a lubricant-outlet connecting channel is provided that connects the first lubricant outlet and the second lubricant outlet. If, for example, lubricant is to be provided to the first consumer only every two or three pumping cycles, which is realizable, for example, via a valve disposed at the lubricant outlet, then the excess lubricant can be pumped from the respective metering chamber also to the respective other lubricant outlet via the lubricant-outlet connecting channel. It is advantageous here in particular if one of the lubricant outlets is configured closable. If, for example, in a field of use it is only necessary to impinge a single consumer with lubricant via the lubricant injector, then the second lubricant outlet can be closed using a closure element. A differently-structurally-designed lubricant injector is not necessary for this. The stock keeping for lubricant injectors is thereby reduced since a single lubricant injector can be used for a variety of fields of use.

In order to further increase this varying usability of the lubricant injector, it is preferred, as a further advantageous exemplary embodiment shows, to provide on the at least one lubricant outlet a preferably interference-fit, releasable connecting device, in particular a screw thread, a snap connection, and/or a plug connection that is designed to connect the lubricant outlet at least to an outlet closure element or a lubricant-line connection element for connecting a lubricant line or a valve unit. The inventive lubricant injector can thereby be used in a simple manner in the desired type of application. The at least one lubricant-outlet connecting channel disposed between the lubricant outlets ensures here that an odd number of lubricant outlets can also be provided using the inventive lubricant injector.

In addition to the first and/or second lubricant outlet, another further lubricant outlet can also be provided at the first and/or second lubricant outlet channel.

According to a further advantageous exemplary embodiment the lubricant injector furthermore includes a control-piston preload element, in particular a return spring, that preloads the control piston in one of the switching states, preferably the first switching state. Here the preload of the control-piston preload element can be adjustable. Here the control-piston preload element makes it possible that if a lubricant pressure abutting on the lubricant inlet drops below a certain threshold value the control piston is returnable into the first switching state. The size of the lubricant-pressure threshold value here can be determined via the preload force of the preload element. A decrease of the lubricant pressure usually occurs at the end of a pumping cycle if no further lubricant is conducted from the lubricant pump into the lubricant supply line and to the lubricant inlet.

In addition, at least one of the lubricant outlets can advantageously be configured as a spring space for the control-piston preload element. A particularly compact lubricant injector can thereby be provided. In addition, such an arrangement of one of the lubricant outlets makes it possible that a lubricant pressure abutting on the lubricant outlet configured in this manner supports the return element and thus a returning of the control piston into the first switching state. This can be advantageous in particular with low ambient temperatures.

On the other hand, in order to transfer the control piston from the first switching state into a second switching state, the control piston is furthermore advantageously equipped with a control-piston workspace that is impingeable with lubricant in order to transfer the control piston into the second switching state against the preload of the preload element. Here it is advantageous in particular if the control-piston workspace is connected to a lubricant switchover pressure channel that is designed to conduct lubricant into the control-piston workspace if a certain lubricant pressure is reached or exceeded at the lubricant inlet and/or in the first control space of the control piston. Using this pressure-determined controlling of the control piston, complex control devices can be omitted, which in turn simplifies construction and reduces costs.

A further aspect of the present invention relates to a lubricant injector block that includes at least two of the above-described lubricant injectors. Here the lubricant injector block can preferably include at least one central lubricant inlet and a central lubricant outlet, wherein the central lubricant outlet is configured to connect the lubricant injector block in series to a further lubricant injector or a further lubricant injector block. Furthermore a central lubricant channel can be provided on the lubricant block that supplies the lubricant inlets of the lubricant injectors disposed in the block with lubricant. A plurality of lubricant consumers can thereby advantageously be supplied with lubricant. Since in particular the first metering chamber and the second metering chamber are connectable to independent lubricant outlets, with an inventive lubricant injector exactly two consumers can be supplied with lubricant. However, this also means that with an injector block with which, for example, eight consumers are to be supplied with lubricant, according to the invention due to the at least two lubricant outlets only four lubricant injectors need to be provided in the lubricant injector block. Thus the installation space can be reduced and costs reduced.

Further advantages and advantageous embodiments are defined in the claims, the description, and the drawings.

In the following the invention shall be described in more detail with reference to the exemplary embodiments depicted in the drawings. Here the exemplary embodiments are of a purely exemplary nature and are not intended to establish the scope of the application. This scope is defined solely by the pending claims.

BRIEF DESCRIPTION OF THE DRAWINGS

FIG. 7 shows a schematic sectional view through a preferred exemplary embodiment of an inventive lubricant injector block.

DETAILED DESCRIPTION

In the following, identical or functionally equivalent elements are designated by the same reference numbers.

Figure 1:
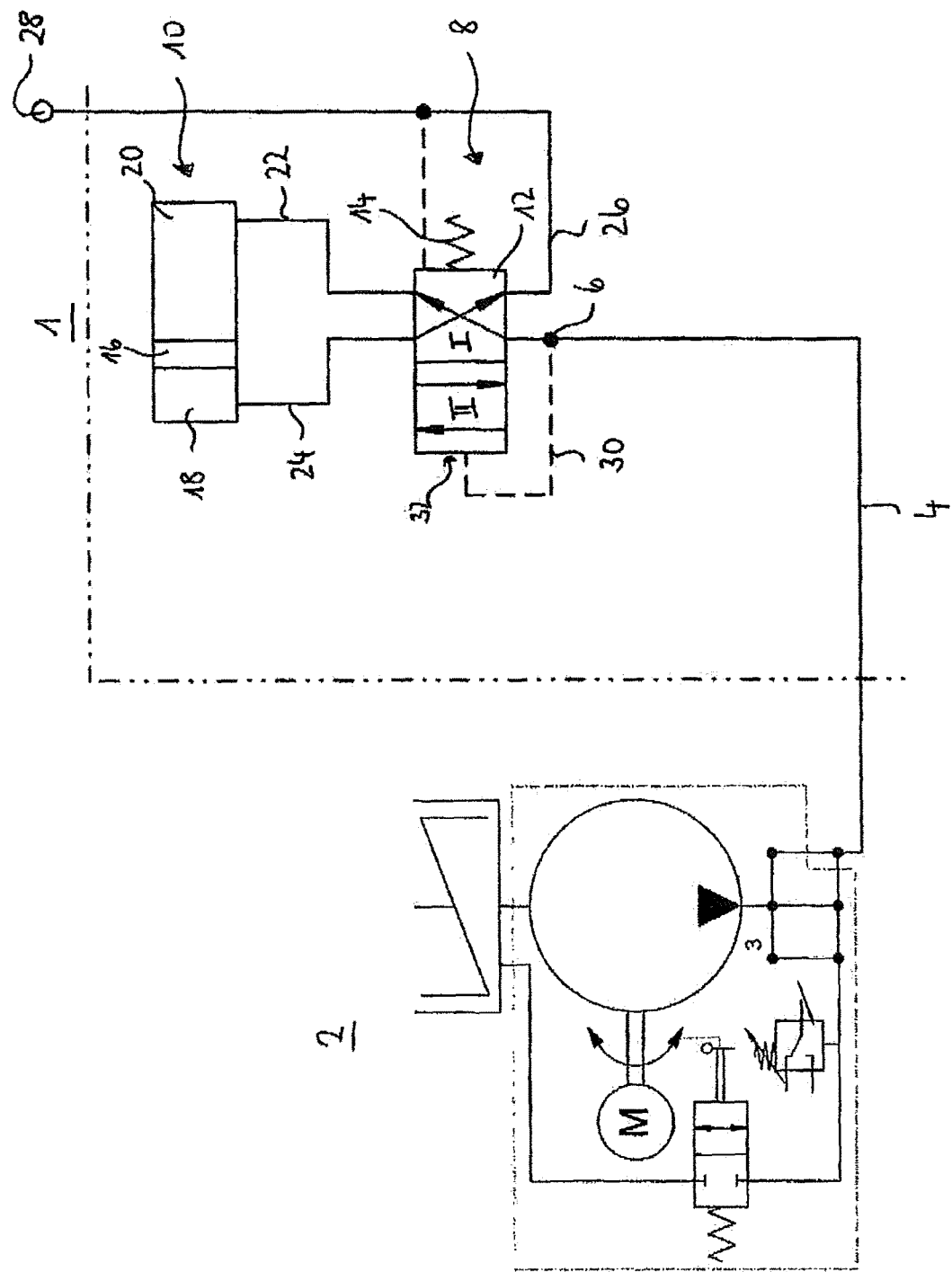
FIG. 1 shows a switching arrangement of the inventive lubricant injector.

FIG. 1 shows a schematic circuit diagram of a lubricant injector 1 that is impinged with lubricant from a lubricant pump assembly, wherein the lubricant is provided, pressurized, via a lubricant line 4 on a lubricant inlet 6 of the lubricant injector 1. The lubricant pump assembly 2 here is configured such that lubricant is pressurized in the lubricant line 4 during a pumping cycle, and at the end of the pumping cycle the lubricant line 4 is switched pressureless. "Pressureless" here means, for example, a pressure of less than 70 bar, while the pressurization falls in a significantly higher pressure range of, for example, more than 100 bar.

Such lubricant pumps are known from the prior art and are therefore not further described.

As can further be seen from FIG. 1, the inventive lubricant injector furthermore includes a control unit 8 and a metering unit 10. The control unit 8 includes a metering piston 12 that is bringable from a first (I) into a second (II) switching state. Here the control piston 12 is preloaded in the first switching state I using a preload element 14, in particular a spring element.

The metering element 10 includes a piston 16 that includes a first piston workspace 18 configured as a first metering chamber, and a second piston workspace 20 configured as a second metering chamber. If a lubricant pressure abuts on the lubricant inlet 6, then in the first switching state I lubricant is conducted via the control piston 12 into the second metering chamber 20 by a first lubricant channel 22. Due to the increasing volume of the lubricant in the metering chamber 20 the piston 16 is displaced toward the first metering chamber 18 so that lubricant is conducted from the first metering chamber 18 via a second lubricant channel 24 to a lubricant outlet 26 and from there out to a lubricant consumer 28.

If the piston 16 has reached its maximum stroke towards the first metering chamber 18, i.e., a further advancing toward the metering chamber 18 is not possible, the pressure of the lubricant increases in the second metering chamber 20, in the first lubricant channel 22, and also at the lubricant inlet 6. Furthermore, a lubricant switchover pressure channel 30 is disposed on the lubricant inlet 6, which lubricant switchover pressure channel 30 conducts lubricant toward a control-piston workspace upon exceeding of a certain lubricant pressure at the lubricant inlet 6 or the control piston 12. The control piston 12 is thereby transferred into the second switching state II against the preload force of the preload element 14.

In the second switching state II lubricant is now supplied via the second lubricant channel of the first metering chamber 18, which in turn effects an advancing movement of the piston 16 toward the second metering chamber 20. The lubricant present in the second metering chamber 20 is thereby pumped via the first lubricant channel 22 toward the lubricant outlet 26.

If at the end of the lubricant pumping cycle the lubricant line 4 pumps no further or little lubricant toward the lubricant inlet 6, the pressure drops in the lubricant line 4 and thus at the lubricant inlet 6. If the lubricant pressure has fallen below a certain threshold value that is preferably determined via the preload force of the preload element 14, the control piston 12 can be returned via the preload element 14 into its first switching state I.

Figure 2:
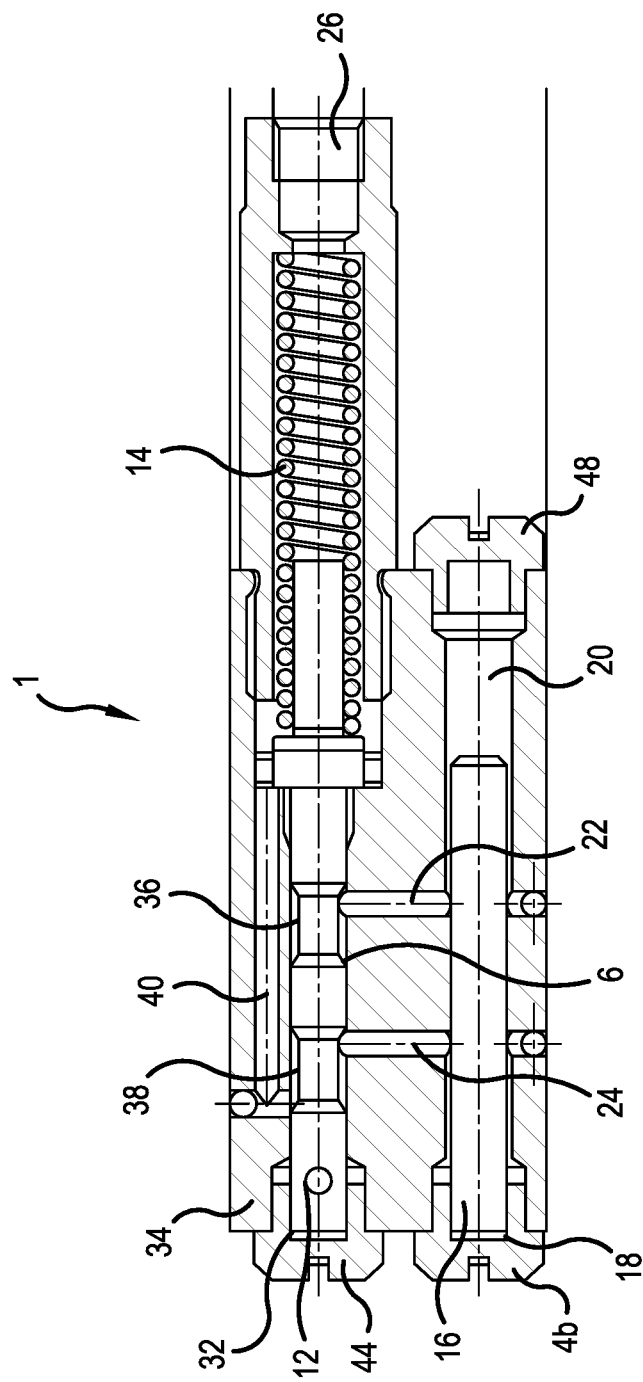
FIG. 2 shows a schematic sectional view through a first exemplary embodiment of the inventive lubricant injector.

FIG. 2 schematically shows a first preferred exemplary embodiment of the inventive lubricant injector 1 at the end of the first switching state I. As can be seen from FIG. 2, the lubricant injector 1 includes a housing 34 wherein the control piston 12 and the metering piston 16 are disposed. Here the control piston 12 and the metering piston 16 can also each be disposed in their own housings that are connectable to each other. Rearward of the control piston 12 the lubricant inlet is schematically indicated. In order to be able to provide the first and the second switching state a first control space 36, in particular a ring space, and a second control space 38 that is also preferably configured as a ring space are disposed on the control piston 12. As can further be seen from FIG. 2, in the depicted first switching state I the lubricant inlet 6 is connected via the ring space 36 to the first lubricant channel 22 and the second metering chamber 20 of the piston 16. On the other hand the lubricant channel 24 is connected via the ring space 38 to a lubricant outlet channel 40, via which lubricant is conducted toward the lubricant outlet 26 disposed on the spring element 14. Since a further advancing of the piston 16 toward the first metering chamber 18 is no longer possible in the state depicted in FIG. 2, the pressure of the lubricant increases in the second metering chamber 20, the first lubricant channel 22, and at the lubricant inlet 6. If the pressure at the lubricant inlet 6 or at the control piston 12 exceeds a certain value, then lubricant can be conducted via the switchover pressure channel 30 not shown here toward the control-piston workspace 32 so that the control piston 12 can be moved into its second switching state II against the preload of the preload element 14.

Figure 3D:
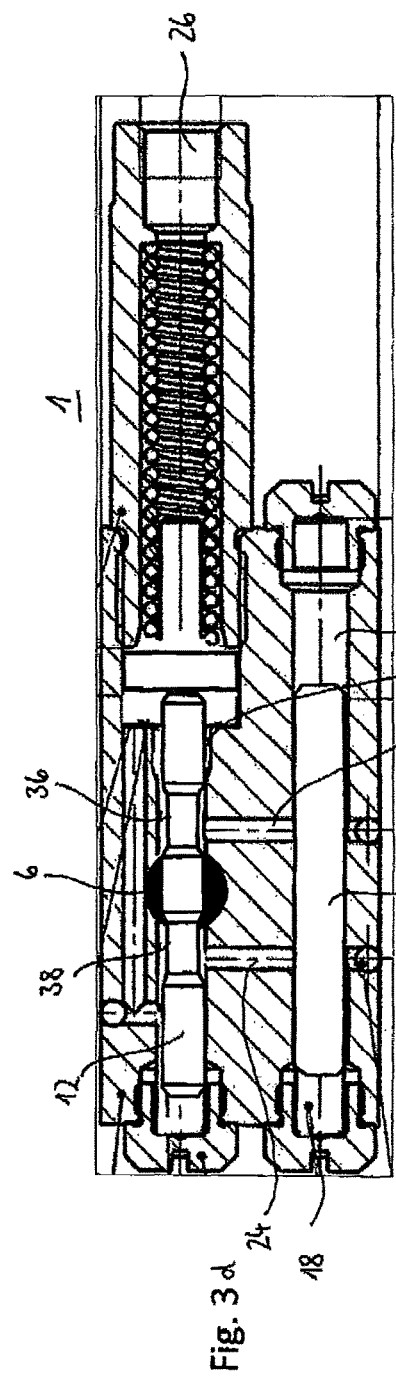
FIG. 3 shows a schematic depiction of the inventive lubricant injector in different switching states during a lubricant introduction cycle.
Figure 3E:
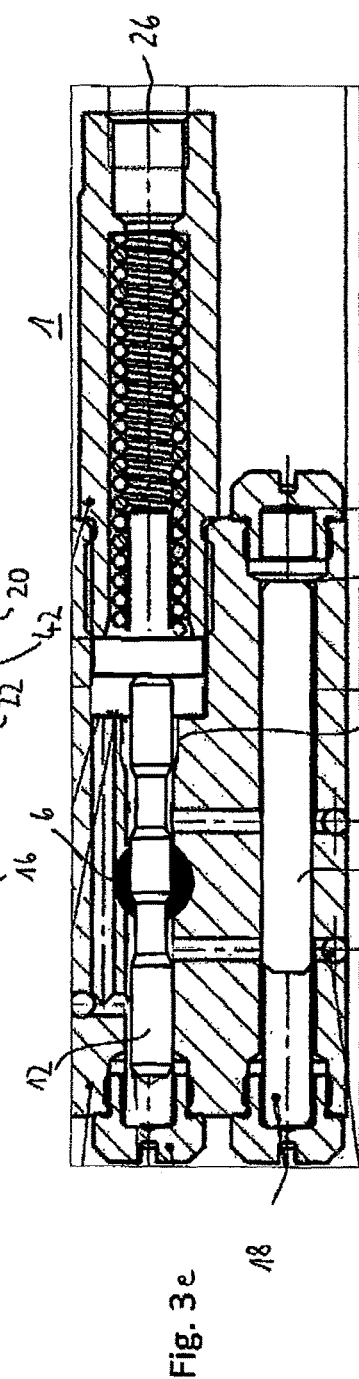
Figure 3F:
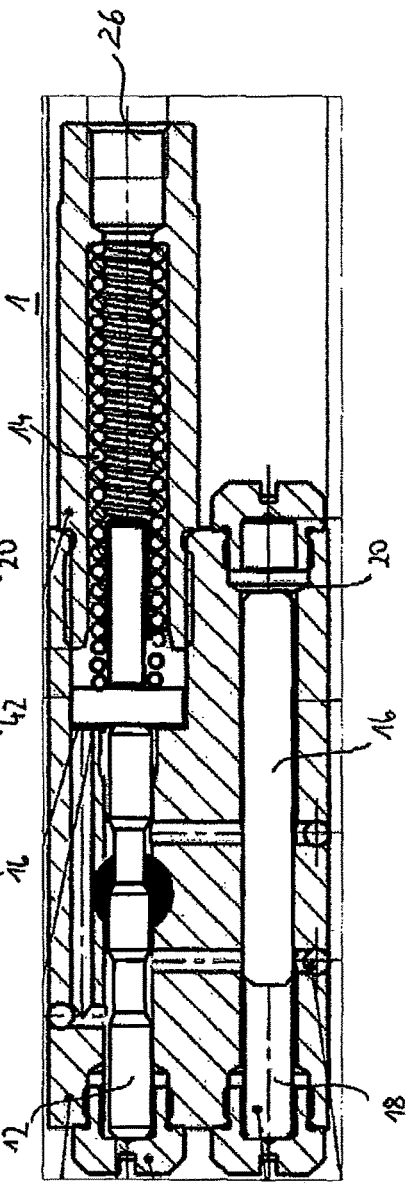

FIGS. 3a to 3f schematically show the movement of control piston and metering piston during exemplarily shown switching states. Here FIG. 3a shows an initial state wherein the lubricant inlet 6 is connected via the first ring space 36 to the first lubricant channel 22 and guides lubricant toward the second metering chamber 20 of the metering piston 16. The piston 16 is thereby moved toward the first metering chamber 18 wherein lubricant from the previous cycle is located, whereby the lubricant present in the chamber 18 is pumped via the lubricant channel 24, the second control space 38 and the lubricant outlet channel 40 toward lubricant outlet 26. FIG. 3b shows an inventive lubricant-injector in an intermediate state, while lubricant is pumped from the first metering chamber 18 toward lubricant outlet 26. FIG. 3c shows a state wherein the metering piston 16 has displaced the lubricant from the first metering chamber 18 and guided lubricant into the control piston workspace 32 of the control piston 12. Via the pressure built up in the control-piston space the control piston 12 is displaced toward the lubricant outlet 26 against the preload of the preload element until the control piston 12 reaches its second switching state II. In the second switching state, as FIG. 3d shows, the second ring space 38 is connected to the lubricant inlet 6 so that lubricant is conducted via the second ring space 38 and the second lubricant channel 24 into the first metering chamber 18. This in turn effects an advancing of the metering piston toward the second metering chamber 20, whereby lubricant is pumped via the first lubricant channel 22 and the first ring space 36 toward the lubricant outlet 26. For this purpose in particular a lubricant outlet channel 42 is disposed. In the end state of the second switching state, which is shown in FIG. 3e, the metering piston 16 is in turn maximally displaced toward the first metering chamber 20 and the first metering chamber is completely filled with lubricant. After reaching this switching state the end of the lubricant pumping cycle is also usually reached so that no further or only little lubricant is pumped from the lubricant pump toward lubricant inlet 6. The lubricant pressure thereby drops in the lubricant line 4 and also in the control-piston workspace 32 so that with the aid of the preload element 14 the control piston 12 can be pushed back into the initial state 12 (see FIG. 3f).

Furthermore, as can be seen in particular in FIG. 2 a plurality of adjusting screws 44, 46, 48 are provided on the inventive lubricant injector 1. Here the stroke of the control piston 12 can by finely adjusted by the adjusting screw 44. Alternatively the adjusting screw 44 can also be configured as a simple cover element. The adjusting screws 46 and 48 advantageously represent so-called metering screws, via which the stroke of the metering piston 16 and thus the metering volume is adjustable. Accordingly via these adjusting screws 46, 48 a metered quantity of the lubricant can be continuously adjustable externally. Alternatively it is of course also possible to determine the metering via the size of the metering piston 16. In order to monitor a function of the lubricant injector 1, a sensor, in particular a proximity sensor, can additionally be provided on the end surface of the metering piston 16 or of the control piston 12, which sensor determines whether the lubricant injector 1 functions as desired. Alternatively or additionally an indicator pin can also be provided on the metering piston 16 and/or control piston 12, which makes possible an optical functional monitoring.

As can be seen in particular in FIGS. 2 and 3, in comparison to the prior art the inventive lubricant injector 1 is assembled from very few elements, so that the entire construction is simplified. Furthermore it is advantageous that lubricant is pumped to the lubricant outlet 26 both directly from the first metering chamber 18 and the second metering chamber 20 during a lubricant pumping cycle, which increases the pumped quantity of lubricant overall.

Figure 4:
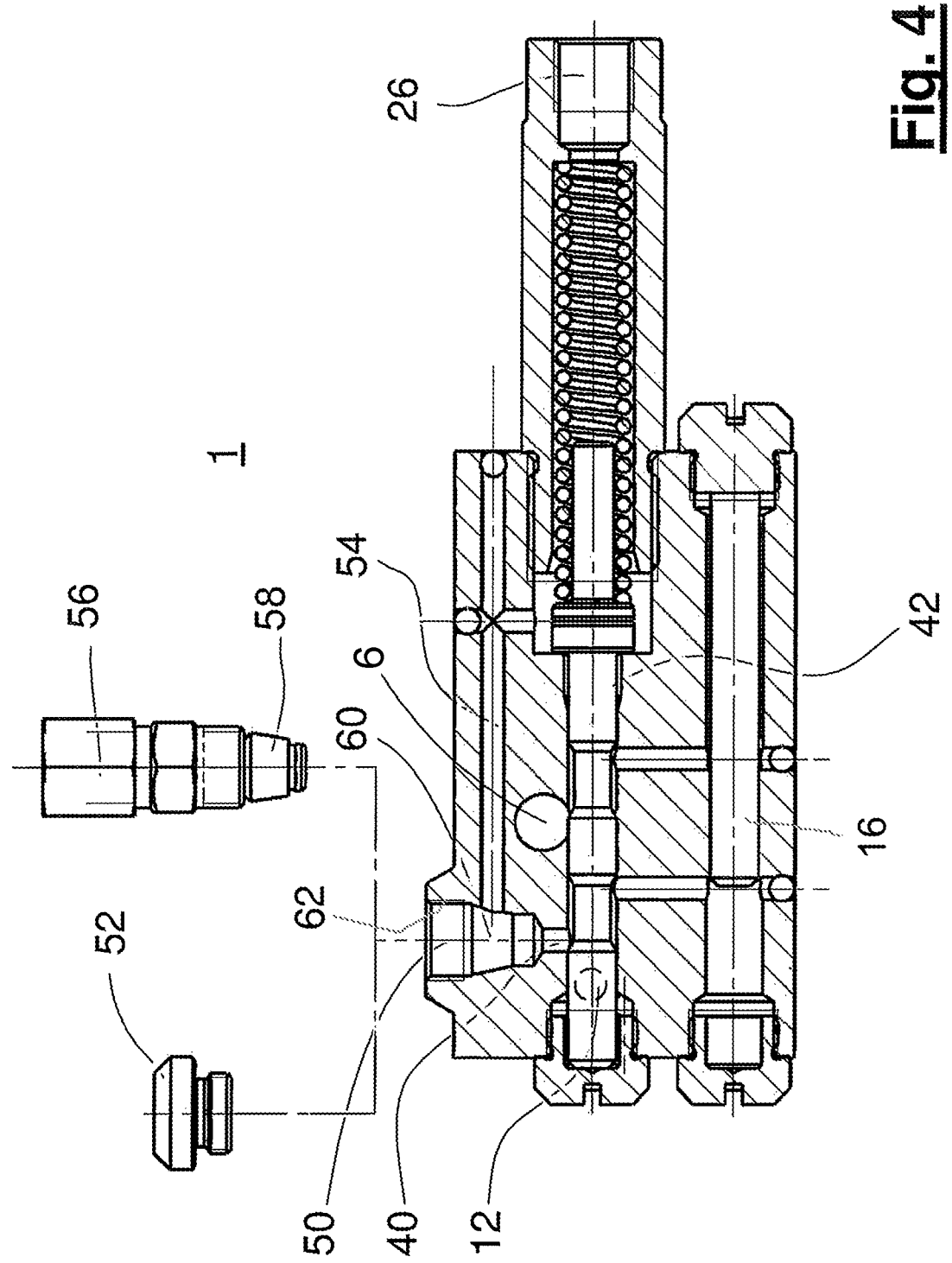
FIG. 4 shows a schematic sectional view through a second preferred exemplary embodiment of the inventive lubricant injector.
Figure 5:
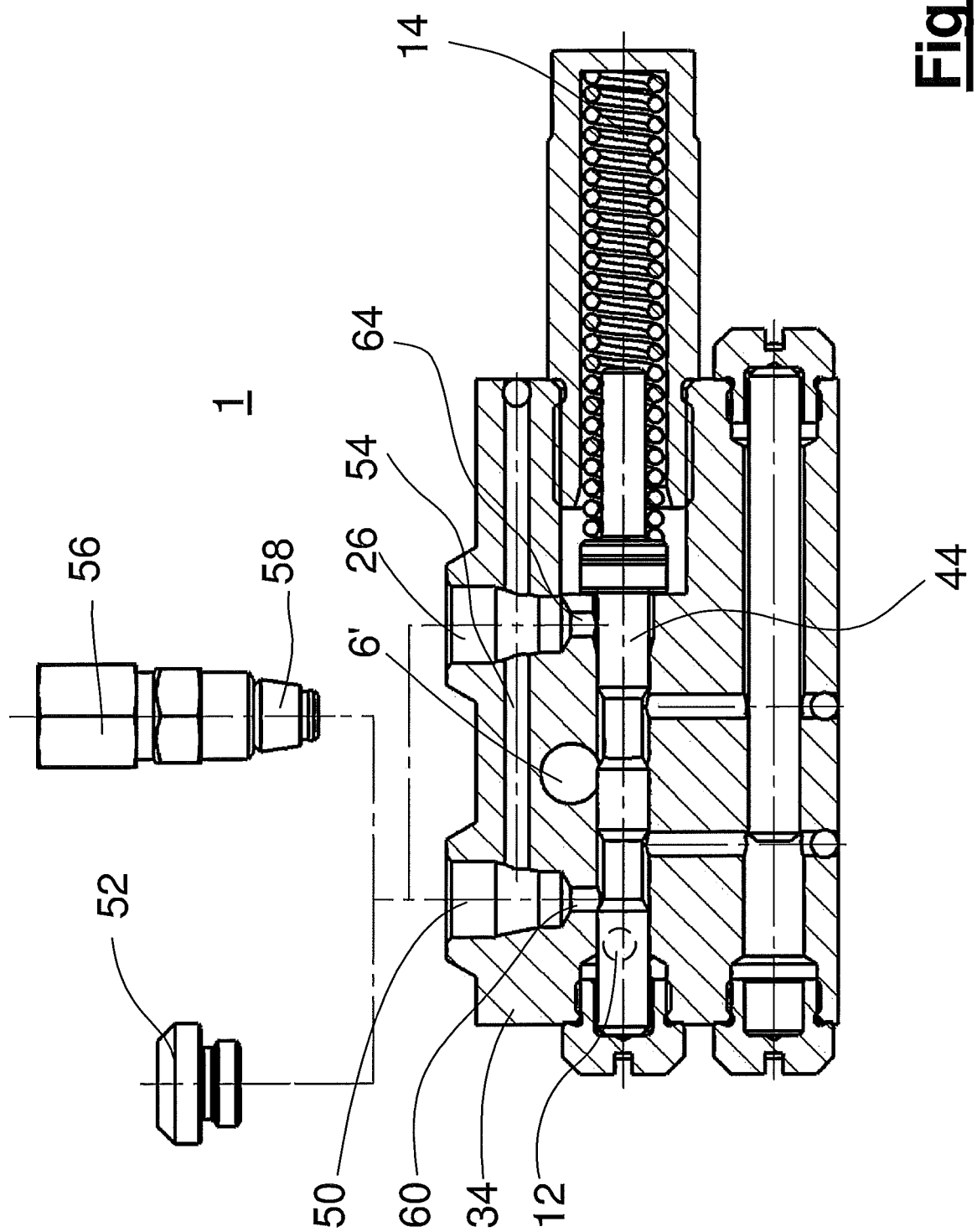
FIG. 5 shows a schematic sectional view through a third preferred exemplary embodiment of the inventive lubricant injector.
Figure 6:
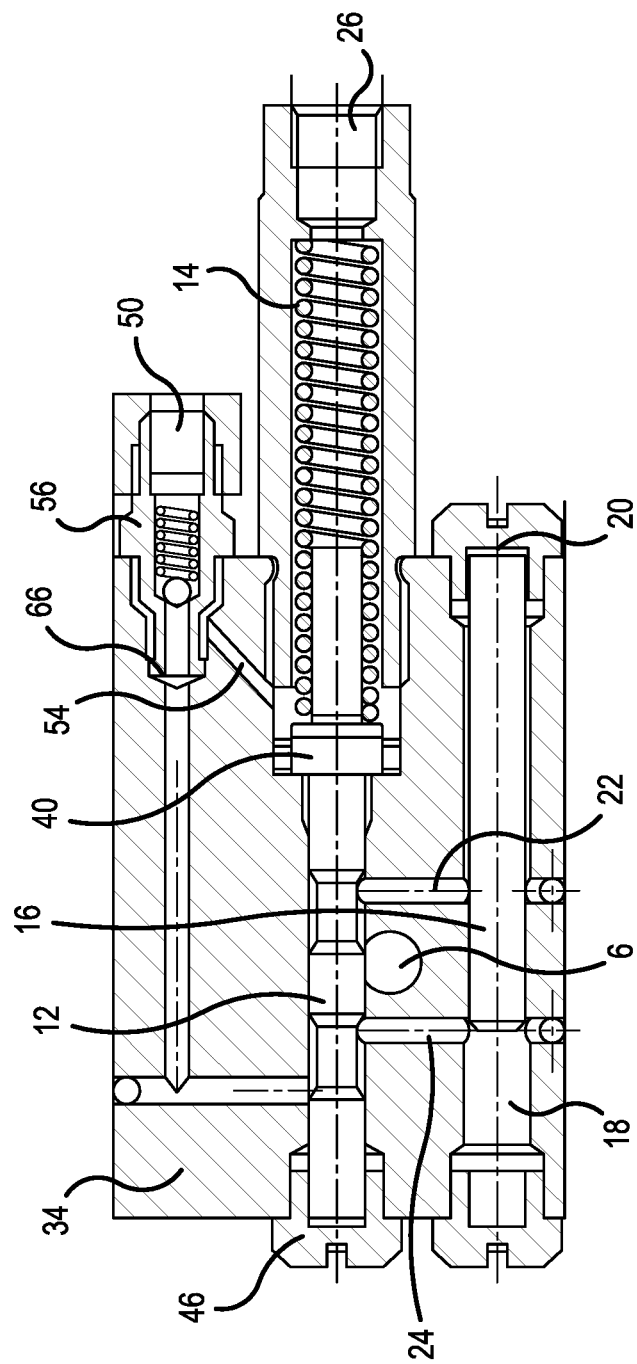
FIG. 6 shows a schematic sectional view through a fourth preferred exemplary embodiment of the inventive lubricant injector.

This inventive design that lubricant is pumped directly to a lubricant outlet 26 both from the first metering chamber 18 and from the second metering chamber 20 also makes possible further inventive designs that are described, for example, in FIGS. 4 to 6. In contrast to the exemplary embodiments depicted in FIGS. 2 and 3, FIGS. 4 to 6 include not only one lubricant outlet 26 but a second lubricant outlet 50. Here, as FIG. 4 shows, for example, the first lubricant-outlet channel 40 may not, as depicted in FIG. 2, extend toward the first lubricant outlet 26, but can extend to a second lubricant outlet 50. As a result lubricant can be provided from the first metering chamber 18 to the second lubricant outlet 50, while the lubricant from the second lubricant chamber 20 is pumped via the second lubricant-outlet channel 42, as discussed in FIG. 2, toward the first lubricant outlet 26.

FIG. 4 schematically shows yet another preferred design of the lubricant injector 1, since the lubricant outlet channel 40 not only opens directly into the lubricant outlet 50, but it is further provided that the lubricant outlet 50 need not obligatorily be used as lubricant outlet. For this purpose a closure element can be fitted in the lubricant outlet 50, which closure element 52 sealingly closes the lubricant outlet 50. However, in order that the lubricant pumped from the first metering chamber 18 can be conducted out of the lubricant-outlet channel 40 toward a lubricant outlet, a lubricant-outlet connecting channel 54 is furthermore provided that, with a closed second lubricant outlet 50, transports lubricant from the lubricant outlet channel 40 toward the first lubricant outlet 26. On the other hand if the second lubricant outlet 50 is to be used as a lubricant outlet, a connecting element 56 can be used in the lubricant outlet 50 that is preferably configured such that it blocks the access to the lubricant-outlet connecting channel 54. In the exemplary embodiment depicted this is achieved via a cone fitting 58, 60 wherein the cone 58 of the connecting element 56 can be fitted directly into the conical opening 60 on the lubricant outlet 50 and blocks the lubricant-outlet connecting channel 54.

Instead of a connecting element designed in this manner another device, for example, a vent device, can be used in the lubricant outlet, which device controls the opening or closing of lubricant outlet 26; 50 or lubricant-outlet connecting channel 54 such that the dispensing location and/or the dispensed amount of lubricant can again be influenced in a targeted manner.

In order to correspondingly variably design the second lubricant outlet 50, a connecting device 62, for example in the form of a thread, can be formed on the lubricant outlet 50, which connecting device 62 ensures an interference-fit receiving, for example, of the closure element 52 or of the connecting element 56. Alternatively, however, such a connection can also be achieved via a plug connection or snap connection.

FIG. 5 shows a further advantageous design of the inventive lubricant injector 1, wherein not only the second lubricant outlet 50, but also the first lubricant outlet 26 are variably designed. For this purpose the first lubricant outlet 26 is no longer, as depicted in FIG. 2, made possible via the spring space of the preload element 14, but is also, like the second lubricant outlet 50 itself, disposed in the housing 34 of the lubricant injector 1. For this purpose the second lubricant-outlet channel 44 is not only configured as a ring space about the control piston but also includes an extension 64 that opens directly into the first lubricant outlet 26. If the lubricant outlet 26 is closed by the closure element 52, lubricant can also be conducted via the lubricant-outlet connecting channel 54 from the first lubricant outlet 26 to the second lubricant outlet 50. In order to block the lubricant-outlet connecting channel 54, a fitting 58 can in turn, as already described with reference to FIG. 4, be disposed on the lubricant-outlet connecting element 56, which fitting 58 interacts with a counter-fitting 60 and closes the lubricant-outlet connecting channel 54.

FIG. 6 schematically shows a further preferred exemplary embodiment, wherein the second lubricant outlet 50 is disposed parallel to the first lubricant outlet 26. Here the first lubricant outlet 26 is in turn formed via the return element 14. Furthermore it is depicted in FIG. 6 that the connecting element 56 is fitted with interference fit in the second lubricant outlet 50. The connecting element 56 furthermore includes an inlet opening 66 that fluidly connects the lubricant-outlet channel 40 to the lubricant outlet 50. Simultaneously a lubricant-outlet connecting channel 54 is closed by the interference-fit receiving of the connecting element 56 in the lubricant outlet 50 so that lubricant can escape from the first metering chamber 18 only via the second lubricant outlet 50. On the other hand, as known, lubricant is supplied from the second metering chamber 20 to the first lubricant outlet 26.

The inventive lubricant injectors are advantageous in particular if a plurality of consumers are to be impinged with lubricant. Then with a single lubricant injector not only one consumer but at least two consumers can be supplied with lubricant. This saves costs and reduces the installation space required.

Furthermore it is depicted in FIG. 7 that the lubricant injectors can not only be provided as individual elements but also disposable as a block one-behind-the-other. Here the lubricant injectors can be connected in series in a common housing, as individual elements, or even as a plurality of blocks.

FIG. 7 here shows a schematic plan view from the control-piston side of a lubricant injector block 100, which is constructed of a plurality, six are depicted, of lubricant injectors 1-1, 1-2, 1-3, 1-4, 1-5, and 1-6, which are disposed in the common housing 34. Of course, however, the lubricant injectors or the control pistons or metering pistons can also be disposed in separate housings, that are connected in a manner corresponding to a block. The lubricant injectors 1-1, 1-2, 1-3, 1-4, 1-5, and 1-6 themselves can be configured as depicted in FIG. 6 and each include a control piston 12-1, 12-2, 12-3, 12-4, 12-5, and 12-6, as well as a metering piston (not depicted) disposed thereunder in the view of FIG. 7. Furthermore FIG. 7 shows that a central lubricant inlet 68 is disposed on the housing 34, via which each of the lubricant injectors 1-1 to 1-6 is impingeable with lubricant. For this purpose in particular a central channel 72 is provided in the housing 34, which central channel 72 connects the lubricant inlets of the control pistons 12-1 to 12-6 to each other and connects them in series. Furthermore a central lubricant outlet 70 can be provided on the housing, via which lubricant would be guidable from the central channel 72 into a further lubricant injector block 100. If no further lubricant injector block 100 is to be provided with lubricant, then the central lubricant outlet 70 is closed so that the lubricant supplied to all lubricant injectors 1 connected in series, or lubricant injector blocks 100, can only escape via the respective lubricant outlets 26, 50 of the individual lubricant injectors 1.

Such an arrangement is particularly advantageous since with one element not only one consumer but a plurality of consumers can be supplied with lubricant. Installation space can in turn thereby be saved.

In particular with the inventive lubricant injector a lubricant injector can be provided that is easy to manufacture due to the small number of parts. Simultaneously the preload springs need not, as in the prior art, be matched to each other, since only one preload spring is required per lubricant injector. With the aid of the closure screws influence can also be exerted on the metered amount.

REFERENCE NUMBER LIST

1 Lubricant injector
100 Lubricant injector block
2 Lubricant pump assembly
4 Lubricant line
6 Lubricant inlet
8 Control unit
10 Metering unit
12 Control piston
14 Preload element
16 Metering piston
18 First metering chamber
20 Second metering chamber
22 First lubricant channel
24 Second lubricant channel
26 Lubricant outlet
28 Lubricant consumer
30 Lubricant switchover pressure channel
32 Control-piston workspace
34 Housing
36 First control space
38 Second control space
40 First lubricant outlet channel
42 Second lubricant outlet channel
44, 46, 48 Adjusting screws
50 Second lubricant outlet
52 Closure element
54 Lubricant-outlet connecting channel
56 Connecting element
58 Conical fitting
60 Conical counter-fitting
62 Thread
64 Extension of the second lubricant outlet channel
66 Opening in the connecting element
68 Central lubricant inlet in the lubricant injector block
70 Central lubricant outlet from the lubricant injector block
72 Lubricant central channel
I First switching state
II Second switching state

The invention claimed is:

1. A lubricant injector comprising at least one lubricant inlet, at least one lubricant outlet, a control piston and a metering piston, wherein the control piston is configured to conduct lubricant from the lubricant inlet to the metering piston and the metering piston is configured to pump the lubricant provided by the control piston to the at least one lubricant outlet, wherein the metering piston includes a first metering chamber and a second metering chamber that are each connected to the at least one lubricant outlet so that both from the first metering chamber and from the second metering chamber lubricant is conductible to the at least one lubricant outlet, and wherein
the lubricant injector further includes a first lubricant channel and a second lubricant channel, wherein the first lubricant channel is configured to connect the second metering chamber to the lubricant inlet or to the at least one lubricant outlet, and the second lubricant channel is configured to connect the first metering chamber to the lubricant inlet or to the at least one lubricant outlet wherein the control piston includes a first control space and a second control space, wherein in a first switching state of the control piston the lubricant inlet is connected via the first control space, but not via the second control space, to the first lubricant channel and the second metering chamber, and in a second switching state the lubricant inlet is connected via the second control space, but not via the first control space, to the second lubricant channel and the first metering chamber,
wherein the first lubricant channel is connected to the at least one lubricant outlet via a first lubricant-outlet channel, and the second lubricant channel is connected to the at least one lubricant outlet via a second lubricant-outlet channel, and
wherein the at least one lubricant outlet comprises a first lubricant outlet and a second lubricant outlet.

2. The lubricant injector according to claim 1, wherein in the first switching state of the control piston the first metering chamber of the metering piston is connected to the at least one lubricant outlet via the second lubricant channel and the second control space and in the second switching state the second metering chamber of the metering piston is connected to the at least one lubricant outlet via the first lubricant channel and the first control space.

3. The lubricant injector according to claim 1, wherein the first lubricant outlet is connected to the first lubricant-outlet channel and the second lubricant outlet is connected to the second lubricant-outlet channel.

4. The lubricant injector according to claim 1, wherein the first lubricant outlet is connectable via the first lubricant-outlet channel the first control space, and the first lubricant channel to the second metering chamber, and the second lubricant outlet is connectable via the second lubricant-outlet channel, the second control space, and the second lubricant channel to the first metering chamber.

5. The lubricant injector according to claim 1, wherein at least one further lubricant outlet is provided at the first and/or second lubricant-outlet channel.

6. The lubricant injector according to claim 1, wherein a screw thread, a snap connection, and/or a plug connection, is provided on the at least one lubricant outlet with which the at least one lubricant outlet is connectable to a valve assembly, a closure element or a connecting element for connecting a lubricant line.

7. The lubricant injector according to claim 6, wherein at least one lubricant outlet comprises a spring space for the control-piston preload element.

8. The lubricant injector according to claim 1, further including a return spring configured to bias the control piston toward the first switching state.

9. The lubricant injector according to claim 1, wherein the control piston includes a control-piston workspace that is impingeable with lubricant in order to shift the control piston into the second switching state against a preload of a preload element.

10. The lubricant injector according to claim 9, wherein the control-piston workspace is connected to a lubricant switchover pressure channel, which is configured to conduct lubricant into the control-piston workspace if a certain lubricant pressure abuts on the lubricant inlet and/or in the first control space of the control piston.

11. The lubricant injector according to claim 10, wherein the lubricant switchover pressure channel is connected to the lubricant inlet and/or the first control space of the control piston.

12. The lubricant injector according to claim 1, wherein at least the first and the second lubricant outlet are disposed on different sides of the lubricant injector, or at least the first and the second lubricant outlet are disposed on the same side of the lubricant injector.

13. The lubricant injector according to claim 1, wherein at least one metering chamber is connectable using an adjusting screw via which a stroke of the metering piston and/or of the control piston is adjustable.

14. A lubricant injector block with at least two lubricant injectors according to claim 1 connected in series.

15. The lubricant injector block according to claim 14, including a lubricant central channel on the lubricant injector block via which the at least two lubricant inlets of the at least two lubricant injectors are supplyable with lubricant.

16. The lubricant injector block according to claim 15, including a central lubricant inlet and a central lubricant outlet on the lubricant injector block that are connected to each other via the lubricant central channel, wherein the central lubricant outlet is closable with a closure element or connectable to a further lubricant injector or a further lubricant injector block.

17. A lubricant injector comprising at least one lubricant inlet, at least one lubricant outlet, a control piston and a metering piston, wherein the control piston is configured to conduct lubricant from the lubricant inlet to the metering piston and the metering piston is configured to pump the lubricant provided by the control piston to the at least one lubricant outlet, wherein the metering piston includes a first metering chamber and a second metering chamber that are each connected to the at least one lubricant outlet so that both from the first metering chamber and from the second metering chamber lubricant is conductible to the at least one lubricant outlet, and wherein
the lubricant injector further includes a first lubricant channel and a second lubricant channel, wherein the first lubricant channel is configured to connect the second metering chamber to the lubricant inlet or to the at least one lubricant outlet, and the second lubricant channel is configured to connect the first metering chamber to the lubricant inlet or to the at least one lubricant outlet wherein the control piston includes a first control space and a second control space, wherein in a first switching state of the control piston the lubricant inlet is connected via the first control space to the first lubricant channel and the second metering chamber, and in a second switching state the lubricant inlet is connected via the second control space to the second lubricant channel and the first metering chamber, wherein the first lubricant channel is connected to the at least one lubricant outlet via a first lubricant-outlet channel, and the second lubricant channel is connected to the at least one lubricant outlet via a second lubricant-outlet channel, wherein the at least one lubricant outlet comprises a first lubricant outlet and a second lubricant outlet, and wherein the first control space is a first annular space in a side wall of the control piston and the second control space is a second annular space in the side wall of the control piston, the second annular space being separate from the first annular space.

18. A lubricant injector comprising at least one lubricant inlet, at least one lubricant outlet, a control piston and a metering piston, wherein the control piston is configured to conduct lubricant from the lubricant inlet to the metering piston and the metering piston is configured to pump the lubricant provided by the control piston to the at least one lubricant outlet, wherein the metering piston includes a first metering chamber and a second metering chamber that are each connected to the at least one lubricant outlet so that both from the first metering chamber and from the second metering chamber lubricant is conductible to the at least one lubricant outlet, and wherein:

the lubricant injector further includes a first lubricant channel and a second lubricant channel, wherein the first lubricant channel is configured to connect the second metering chamber to the lubricant inlet or to the lubricant outlet, and the second lubricant channel is configured to connect the first metering chamber to the lubricant inlet or to the lubricant outlet wherein the control piston includes a first control space and a second control space, wherein in a first switching state of the control piston the lubricant inlet is connected via the first control space to the first lubricant channel and the second metering chamber, and in a second switching state the lubricant inlet is connected via the second control space to the second lubricant channel and the first metering chamber, the first lubricant channel is connected to the at least one lubricant outlet via a first lubricant-outlet channel, and the second lubricant channel is connected to the at least one lubricant outlet via a second lubricant-outlet channel, and the at least one lubricant outlet comprises a first lubricant outlet and a second lubricant outlet, and further including at least one lubricant-outlet connecting channel that connects at least the first lubricant outlet and second lubricant outlet.

19. The lubricant injector according to claim 18, wherein at least one of the at least one lubricant outlet is closable, and lubricant is guidable via at least one lubricant-outlet connecting channel to an open one of the at least one open lubricant outlet.

20. The lubricant injector according to claim 18, wherein a valve assembly, a closure element, or a connecting element is disposed in at least one lubricant outlet, and configured to open the corresponding lubricant outlet or the lubricant-outlet connecting channel.

\* \* \* \* \*